Patented Dec. 7, 1937

2,101,821

UNITED STATES PATENT OFFICE 2,101,821

MANUFACTURE OF UNSATURATED ORGANIC COMPOUNDS

John William Croom Crawford, Norton-on-Tees, England, assignor to Imperial Chemical Industries Limited, a corporation of Great Britain No Drawing. Application November 5, 1935, Serial No. 48,448. In Great Britain November 7, 1934

30 Claims. (Cl. 260—106)

The present invention relates to new and improved methods of manufacturing unsaturated esters and more particularly to the preparation of alkacrylic acids, such as methacrylic acid, and their esters. The application is in part a continuation of my copending application Serial No. 684,749. Amongst methods previously proposed for the preparation of methacrylic acid and certain of its esters there may be mentioned the dehydration of alpha-hydroxyisobutyric acid or its esters, with the aid of certain catalysts and treatment of the corresponding alpha-brominated derivatives with certain bases. Methacrylic acid and its ethyl ester have also been prepared from methacrylic nitrile, a compound which can itself be produced by dehydrating acetone cyanohydrin, for instance with phosphorus pentoxide. On hydrolysis, in the absence of an alcohol, methacrylic nitrile yielded methacrylic acid, while in the presence of ethyl alcohol ethyl methacrylate was obtained. Again ethyl hydroxyisobutyrate has been obtained by hydrolyzing acetone cyanohydrin in the presence of ethyl alcohol.

According to the present invention, the starting material is a symmetrical or unsymmetrical ketone cyanohydrin, which is treated, as will be described hereinafter, with a strongly concentrated acid and an alcohol, or water and an alcohol, and the alpha-substituted acrylic ester is obtained directly from the reaction mixture in good yield.

My invention comprises essentially the interaction of a ketone cyanohydrin with a strongly concentrated acid, such as sulphuric acid, oleum, sulfonic acids, alkyl sulfonic acids, phosphoric acid, hydrochloric acid and the like, and subsequently treating the reaction mixture with an alcohol to form the ester of the unsaturated acid produced. The general process may be understood by reference to the following description of the preparation of methyl methacrylate from acetone cyanohydrin.

Acetone cyanohydrin is treated with strong sulphuric acid, or with oleum, sulfonic acids, or alkyl sulfonic acids, in the presence or absence of an inert diluent, at a temperature which may range from approximately 70° C. upwards to somewhat above 100° C., advantageously maintaining the reaction mixture for some time at a high temperature considerably above 80° C. which may be up to about 140° C., cooling if necessary and adding to the reaction mixture a monohydric or polyhydric alcohol and heating, preferably in the presence of an antipolymerizing agent, until the reaction has progressed as far as possible, and recovering the methacrylic ester in a suitable manner. The acetone cyanohydrin used may, if desired, be the crude product obtained from hydrocyanic acid and acetone in the presence of a catalyst, and in this case I have obtained the best yields of the methacrylic derivative when the temperature which the acetone cyanohydrin is cooled to before neutralization in the course of its preparation is about $-15°$ C., using potassium carbonate or hydroxide, or cyanide or a strong organic base as the catalyst. At least 1 mole of sulphuric acid should be used to each mole of acetone cyanohydrin, but I prefer not to use a great excess of acid, the best results having been obtained using 1–1½ moles of sulphuric acid per mole acetone cyanohydrin calculated on the crude acetone cyanohydrin content of the crude material. I prefer to use very strong sulphuric acid, say, of 94–100% strength, and it is often preferable to use fuming sulphuric acid containing 1 to 10% $SO_3$ or more. The reaction which takes place when the acetone cyanohydrin is added to the sulphuric acid is vigorous, and it is advisable, during this phase of the process, to keep the reaction temperature below 80° C. The mixture, however, becomes very thick and stirring difficulties may render it necessary that higher temperatures should be used. In practice excellent results are obtained at 100° C.–110° C. in the absence of a diluent. The product of interaction is a colourless to yellow or brownish paste-like deliquescent mass. If desired this product may be heated with the alcohol, but I have found that considerably better yields are obtained if instead of adding the alcohol directly, the product obtained from the acetone cyanohydrin and the sulphuric acid is first heated to a temperature considerable above 80° C., and I prefer to heat to about 140° C. At this temperature about one hour's heating will be found sufficient. It cannot, however, be heated to a very much higher temperature than that. The mass is then heated in presence of an alcohol for a suitable period of time until the reaction is apparently complete. This heating may be carried out in a closed vessel, or a vessel provided with a reflux condenser, or it may be carried out so that the methacrylic ester produced is distilled off. Suitable alcohols are for instance, ethyl, methyl, propyl, butyl, amyl, cetyl, benzyl, cyclohexanol, ethylene glycol, ethylene glycol monoethyl ether, ethylene glycol monoacetate and ethylene chlorhydrin.

The antipolymerization material may for instance be sulphur, diphenylamine, copper, hydroquinone, pyrogallol, tannic acid, resorcinol, or cresol. Only small quantities of these are required. The object of using the antipolymerization material is to prevent loss of yield by excessive polymerization of the esters. It is true that in the absence of an antipolymerizing material some yield of the unpolymerized product will be obtained, but considerably better yields are obtained with the aid of a material of this kind, several of which are known. It will be understood that it is desirable to introduce the antipolymerizing material at an early stage.

With regard to the method of recovery, the esters may be separated by diluting the reaction mixture with water, or by distillation, directly or with steam. I have obtained my best results in the latter case by vacuum or steam distillation, and this is more particularly the case when the product of reaction between acetone cyanohydrin and sulphuric acid has been heated to a high temperature around 140° C. before introducing the alcohol. When the temperature at which this heating has been carried on is lower, say, at about 100° C. direct distillation gives reasonably good results.

In carrying out this embodiment of the invention, the product of reaction between acetone cyanohydrin and sulphuric acid which may have been heated for instance to about 100° C. may be treated with an alcohol along with an antipolymerizing agent, the mixture being warmed until the reaction is substantially complete, after which the distillation is commenced. The distillate may be worked up by fractional distillation, whereby separation into the constituents may be effected, or if desired, the alpha-hydroxyisobutyric ester may be washed out of the distillate with water before fractionating. The methacrylic ester obtained in this way may be condensed and further purified, for example by removal of acidic substances by washing with water or diluted aqueous alkali hydroxide or carbonate followed by drying over calcium chloride or other suitable desiccating material, after which treatment it may be redistilled in presence of a polymerization inhibitor.

Similar methods of purification are applicable to esters obtained by steam distillation instead of direct distillation of the product of reaction at about 140° C. between acetone cyanohydrin and sulphuric acid, but in general it is found that it is only necessary to wash the steam distillate free of acid products, dry and redistil it in order to obtain a practically pure methacrylic ester.

I have found that ketone cyanohydrins other than acetone cyanohydrin are capable of reacting in a similar manner to acetone cyanohydrin, i. e. the cyanohydrin may be reacted with sulphuric acid, oleum, sulphonic acids or alkyl sulfonic acids and the reaction product subsequently heated with an alcohol, or water and an alcohol, to give unsaturated compounds.

The ketones from which cyanohydrins suitable for the process may be prepared by reaction with hydrocyanic acid, are conveniently represented by the general formula:

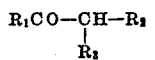

where $R_1$ is an organic radicle, $R_2$ an organic radicle, hydrogen or a halogen, and $R_3$ an organic radicle, hydrogen or a halogen. Alternatively, where $R_2$ is hydrogen, $R_1$ and $R_3$ may form part of a polymethylene ring. Examples of such ketones are the symmetrical or unsymmetrical aliphatic ketones, such, for example, as the series of dialkyl ketones, diethyl, dipropyl, dibutyl, diamyl and the higher symmetrical ketones, as well as methyl ethyl, methyl propyl, methyl isopropyl, methyl butyl and the higher unsymmetrical ketones, such as methyl nonyl, methyl octyl, etc., similarly the ethyl propyl, propyl butyl, isobutyl amyl and higher unsymmetrical ketones; the symmetrical and unsymmetrical aryl or aralkyl ketones, such, for example, as benzyl ethyl ketone, tolyl ethyl ketone, dibenzyl ketone, methyl benzyl ketone and the like may be used in lieu of acetone.

The invention is illustrated by the following examples. The parts are by weight.

*Example 1*

85 parts acetone cyanohydrin are added with good agitation to 100 parts 98% sulphuric acide, the temperature of the mixture being kept below 80° C. by cooling. 40 parts of methyl alcohol are now added, with continued agitation, and the mixture is warmed to 100° C. for about an hour, and then distilled. The distillate is washed with sodium sulphite solution and water to remove sulphur dioxide, methyl alcohol, and other soluble products. It weighs 66 parts, from which 21 parts methyl methacrylate may be obtained by fractional distillation in an atmosphere of nitrogen, along with some methyl alpha-hydroxyisobutyrate.

*Example 2*

850 parts of crude acetone cyanohydrin containing 94% of its weight of pure acetone cyanohydrin are run into 1200 parts of 98% sulphuric acid with stirring and cooling below 80° C. The mixture is then heated to a temperature of 98–100° on a steam bath for 3 hours and allowed to cool somewhat, and 600 parts of methyl alcohol and 10 parts sulphur are added. This mixture is heated again in the steam bath for 16 hours, and distilled, 1075 parts of distillate are obtained, from which, by fractional distillation over sulphur, 372 parts of methyl methacrylate (39.6% theory), and 263 parts of methyl alpha-hydroxyisobutyrate, (24.3% theory) are obtained, calculated on the acetone cyanohydrin content of the crude starting material.

*Example 3*

850 parts of crude acetone cyanohydrin, made by leading hydrogen cyanide into commercial acetone, are run into 940 parts of 98% sulphuric acid, with cooling and agitation, so that the temperature of the mixture does not exceed 80° C. This mixture is now treated with 600 parts of absolute ethyl alcohol and 10 parts of sulphur (to minimize polymerization of ethyl methacrylate formed), and the mixture is heated on the water bath for 16 hours, at the end of which period it is distilled from an oil bath until a thermometer placed in the mixture shows 220° C. The distillate, consisting of crude ethyl methacrylate, weighs 1110 parts. It is poured into water, and the oily layer of ethyl methacrylate separated off. This is washed with water, and gives a redistillation 300 parts of pure ethyl methacrylate.

*Example 4*

850 parts of crude acetone cyanohydrin, made by leading hydrogen cyanide into commercial acetone, are run into 940 parts of 98% sulphuric acid, with cooling and agitation, so that the temperature of the mixture does not exceed 80° C. After the temperature shows signs of diminishing the mixture is gradually heated on a steam bath at a temperature of 98–100° for 3 hours. It is then allowed to cool somewhat, and 600 parts of absolute ethyl alcohol together with 10 parts of sulphur are added. The mixture is then heated on a steam bath for 16 hours. The remainder of the process is carried out as in Example 1.

Example 5

8 lbs. of sulphuric acid of 98% purity are placed in a lead-lined jacketed iron vessel, which is provided with a reflux condenser and a mechanical stirrer. Stirring is commenced, and 5 lb. 11 oz. of acetone cyanohydrin, prepared by the reaction between acetone and hydrogen cyanide and containing approximately 88% of real acetone cyanohydrin, are run into the sulphuric acid with stirring and cooling of the latter. The temperature of the mixture is maintained by regulation of the rate of addition of the acetone cyanohydrin at 70–75° C. When all the cyanohydrin has been added 2 oz. of sulphur are added to the mixture as an antipolymerization catalyst and the mixture is heated by passing steam through a jacket so as to maintain a temperature of 100° for one hour. The temperature is then allowed to fall to 60° C., and 2 lb. 3 oz. of 99% methyl alcohol are added with continuous stirring. The mixture is then heated at 90° C. for one hour, and is thereafter run into a vessel connected to a condenser for distillation. Heat is applied by means of an oil bath to the distillation vessel to carry out the distillation. The distillation commences when the temperature reaches 90° C. and is continued until the temperature reaches 220° C. An antipolymerizing agent such as sulphur or hydroquinone is placed in the receiver to prevent polymerization of the methyl methacrylate which condenses. The distillate, weighing about 4½ to 5 lbs., is fractionated through an 8 ft. column packed with glass rings. Methyl alcohol and acetone are recovered below about 60° C. substantially free from methyl methacrylate. The fraction boiling from 60–90° C. contains methyl methacrylate, methyl alcohol and water, and the ester can be separated by shaking it with brine or by treating the product with calcium chloride. On drying the separated product over calcium chloride and refractionating it, a sharp separation into its constituents is obtained, and the pure ester boiling over a range of about 0.1–0.2° may be collected in the fraction boiling at 99°–101° C. The pure ester is also recovered by refractionating the original fraction boiling at 90°–102° C. and the yield of pure methyl methacrylate thus obtained amounted to 2 lbs. 13 oz., or 48.3% of the theoretical calculated on the pure acetone cyanohydrin. The residue boiling above 102° C. from the original fractionation contains about 14% calculated as above of methyl alpha-hydroxy-iso-butyrate which may be recovered by distillation and if desired may then be converted into methyl methacrylate by dehydration.

Example 6

170 parts of crude acetone cyanohydrin containing approximately 153 parts of the pure compound are added slowly with stirring to 200 parts of concentrated sulphuric acid (99%). The rate of addition is regulated so that the temperature of the mixture remains steady at 60° C. Towards the end of the addition, the mass thickens and becomes pasty. 10 parts of copper powder are introduced to prevent subsequent polymerization and the mixture is heated with stirring to 140° C. for 1 hour. The mass is mobile when hot and becomes somewhat darker in colour. It is then cooled to 100° C. 88 parts of methyl alcohol are added and the mixture is boiled under a reflux condenser for 16 hours. 150 parts of water are then added, and the upper layer of crude methyl methacrylate amounting to 122 parts is separated, and fractionally distilled. A binary mixture of water and methyl methacrylate distils at 80° C. and the temperature then rises rapidly to 99° C. 25 parts of methyl methacrylate can be separated from these first runnings. The main methyl methacrylate fraction (about 70 parts) distils at 100–105° C.

Example 7

Acetone cyanohydrin is treated with sulphuric acid as described in Example 6 and 126 parts of ethyl alcohol are added. The mixture is stirred for 16 hours and boiled under a reflux condenser. It is cooled and 150 parts of water are added. The upper layer of ethyl methacrylate is separated, and distilled. The main fraction (102 parts) of ethyl methacrylate, has B. P. 116–120° C.

Example 8

204 parts of n-butyl alcohol are used instead of 126 parts of ethyl alcohol as in Example 7.

Distillation as before gives a main fraction of n-butyl methacrylate of B. P. 156–161° C.

Example 9

25 lbs. acetone cyanohydrin containing 88% of the pure compound are added with agitation to 35 lbs. 98% sulphuric acid containing ½ lb. diphenylamine at a temperature of 100–110° C. over the 1½ hours. The reaction mixture is heated at 135° C.–140° C. with agitation for 1 hour. It is then cooled to 75° C., and 12.5 lbs. methyl alcohol are added over about ½ hour, with continued agitation. A vessel with reflux condenser is used for these operations. The mixture is allowed to stand for 16 hours, during which time it gradually cools off. It is next warmed with stirring up to 70° C. to dissolve the crystalline deposit and is blown over into a vessel set for steam distillation. Low pressure steam is blown into the mixture, and the distillate containing the methyl methacrylate is collected over sulphur or diphenylamine until a test portion remains clear on the addition of saturated brine. The upper layer is then separated and is twice washed with half its volume of saturated brine and is dried over calcium chloride in presence of diphenylamine and sulphur and is fractionated as in Example 5. 15 lbs. of practically pure methyl methacrylate boiling at 98–102° C. are obtained. The product may be used for the production of polymerized methyl methacrylate.

Example 10

198 parts of methyl ethyl ketone cyanohydrin, prepared from the ketone by interaction with hydrogen cyanide, and containing 93.5% of the pure cyanohydrin, were added to a cooled and agitated mixture of 294 parts of sulphuric acid containing 0.3% of free sulphur trioxide, and 0.5 part of powdered copper. The rate of addition of the cyanohydrin was adjusted so as to maintain a temperature of 80–85° C. within the reaction mass. The product, a viscous liquid at 80–85° C., was heated to 130° for a period of 1 hour, cooled to 80°, and treated with a mixture of 72 parts of water and 184 parts of absolute ethyl alcohol. The whole was heated to boiling under a reflux condenser for 20 hours, after which period a mixture of the stereoisomeric forms of methyl crotonic acid ethyl ester had separated on top of the remainder of the reaction mixture. The mixture was poured into 300 parts of water, the ester layer removed, and washed with an equal volume of water. The ester thus obtained weighed 190 parts. It was further purified by distillation, yielding 160 parts of the mixed esters boiling between 146 and 170°; the residue amounting to about 25 parts, consisted mainly of methyl crotonic acids.

Example 11

396 parts of crude methyl ethyl ketone cyanohydrin (containing 93.5% cyanohydrin, 1.0% free hydrocyanic acid, remainder methyl ethyl ketone), were mixed into 588 parts of sulphuric acid containing 0.4% of free sulphuric anhydride and 1 part precipitated copper. The temperature of the acid mixture was kept at 75–85° C. by cooling and by regulation of the cyanohydrin feed, and good agitation of the acid employed. After addition of the cyanohydrin, the mixture was heated to 130° for 1 hour, and then cooled to 60°. Analysis of the product at this stage showed a 33.3% content of pentenic acid amides, corresponding to 88.8% conversion of the methyl ethyl ketone cyanohydrin. To the cooled product was added a mixture of 144 parts of water and 256 parts of methyl alcohol, and the whole heated to boiling under a reflux condenser for 15 hours. The reaction mixture was run into 600 parts of water and the ester layer which separated on the top removed. It weighed 289 parts and, on analysis, showed 86.4% content of methyl pentenic esters, 8.0% content of pentenic acids, corresponding to 54.5% and 8.8% theoretical yields respectively of ester and acid, based on the methyl ethyl ketone employed to prepare the crude cyanohydrin used.

216.4 parts of the washed and dried crude ester gave on distillation 35.9 parts of material boiling at 125–129.5° C. at atmospheric pressure, and 153.7 parts boiling at 129.5–141.5° C., with a higher boiling residue of 22.5 parts. The first fraction consisted mainly of methyl alpha ethyl acrylate which polymerized on warming with benzol peroxide to a clear resinous product. The fraction 129.5–141.5° C. consisted of a mixture of methyl angelate and methyl tiglate.

Example 12

508 parts of methyl isobutyl ketone cyanohydrin (containing 94% cyanohydrin) were mixed into 588 parts of 100% sulphuric acid and 1 part of precipitated copper, at a temperature of 80–85° C. The mixture was heated to 120° C. for 1 hour, cooled to 110° and 144 parts of water added, after which it was heated for 2 hours to 125° to hydrolyze the unsaturated acid amide, cooled to 85° C. and treated with 256 parts of methyl alcohol. The whole was then heated to boiling under reflux for 2 hours, cooled to 60° and poured into an equal volume of water. A crude ester weighing 423 parts separated and was found to contain 44.4% of methyl alpha-methyl-beta-isopropylacrylic acid. The latter was removed by agitation with alkali solution, and the ester purified by fractional distillation. It boiled at 46–49° C./6 mm., and an amount of alpha-methyl-beta isopropylacrylamide boiling at 110–120° C./3.5 mm. was also recovered. The latter material melted at 82–84° C.

Example 13

360 parts by weight of chloroacetone cyanohydrin containing 93.2% of pure cyanohydrin, were run with agitation and cooling into a mixture of 1 part of precipitated copper and 450 parts of 100% sulphuric acid at such a rate as to maintain the temperature of the reaction mixture at 80° C. On completion of addition of the cyanohydrin, the temperature of the reaction mixture was raised. At approximately 100°, deposition of white solid occurred with evolution of heat. Heat was applied to raise the temperature of the mixture to 130°, where it was kept for 1 hour. Some frothing occurred during the period of heating, and a loss in weight of some 6% was observed. Analysis of the product showed a 16.7% content of unsaturated amide, equivalent to a 51.9% conversion of the chloroacetone cyanohydrin.

108 parts of water were added to the amide mixture, gradually, since much heat is evolved, followed by 192 parts of methyl alcohol, and the mixture heated to boiling under a reflux condenser for 19 hours. It was then run into 750 parts of water and the upper layer of ester separated. This was washed with dilute alkali, then water, dried over anhydrous sodium sulphate, and purified by distillation. The fraction 155–160° consisted of methyl-alpha-methyl-beta-chloracrylate.

Example 14

250 parts of crude cyclohexanone cyanohydrin, obtained by the interaction of cyclohexanone with an equimolecular proportion of hydrocyanic acid in presence of piperidine, and containing 92% of cyanohydrin, were added to a stirred and cooled mixture of 294 parts of 0.8% oleum and 0.1 part of copper bronze (90% copper, 10% zinc), the temperature of the mixture being kept at between 80° and 90° C. The product was heated for 1 hour at 120°, and after cooling to about 80° C. treated with 72 parts of water and 184 parts of methyl alcohol. This mixture was heated to boiling under a reflux condenser for 8 hours, and run into 300 parts of water. The upper layer of ester was separated, washed with water and then agitated with dilute caustic soda to remove free acid. Distillation under reduced pressure resulted in 150 parts of methyl cyclohexene-1-carboxylate boiling at 78–84° C./16 mm. being collected. After a redistillation, the ester (boiling at 77–79° C./17 mm) had density $d_{20}^{20}$ 1.0307, refractive index $n_D^{20}$ 1.4750.

Example 15

294 parts of acetophenone cyanohydrin, containing 70% of pure cyanohydrin, the remainder being acetophenone, were mixed into a suspension of 1 part of precipitated copper in 294 parts of 100% sulphuric acid. Considerable heat evolution occurred; the temperature of the acid was maintained by cooling at 80–85° C. The product, a thick brown liquid, was heated at 100° C. for ½ hour, cooled to 90° C., and a mixture of 72 parts of water and 184 parts of absolute ethyl alcohol run in. The whole was heated to boiling under a reflux condenser for 15 hours, cooled to 40° C and run into an equal volume of water. The layer of ester which separated was washed with brine. It weighed finally 353 parts, containing 35.0% of ethyl atropate and 13.1% of atropic acid. This crude ester was washed free from acid with dilute caustic soda and distilled under reduced pressure. The ester was collected at 115–134°/18 mm. and weighed 15 parts.

Example 16

508 parts of crude methyl-isobutyl ketone cyanohydrin, containing 89% of the pure cyanohydrin, were gradually run into a stirred and cooled mixture of copper powder (1 part) in 99.9% sulphuric acid (588 parts), the temperature of the acid being allowed to rise through the heat of reaction with the cyanohydrin, to 80–85° C. When the cyanohydrin was added, the temperature of the mixture was increased to 110° and kept there for 1 hour. The product showed on analysis a content of heptenic acid amide of 34.2% corresponding to an 83.0% conversion of the cyanohydrin.

The amide-sulphuric acid mixture was now cooled to a temperature of 60° and treated with a mixture of 144 parts of water and 256 parts of methyl alcohol. Heat was again applied, and the mixture boiled under a reflux for 40 hours, the temperature of the boiling liquid being 93–94°. The product of this hydrolysis and esterification was cooled to 60° and run into a separating vessel containing 500 parts of water. The ester layer, which came to the top, was drawn off and weighed 375 parts. Analysis of this showed it to contain 78.9% of methyl heptenic ester and 7.1% of heptenic acid. The crude ester was neutralized by agitation with dilute caustic soda, and after washing with water weighed 322 parts. It was purified by distillation under reduced pressure. 309 parts of the neutralized crude ester, after removal of a fraction boiling up to 56°/19 mm. and weighing 6 parts, gave a main fraction boiling 56–70°/19 mm. and weighing 257 parts. This consisted of the methyl ester of alpha-methyl-beta-isopropylacrylic ester, a colourless liquid with a smell reminiscent of honey. A further fraction, B. P. 70–140°/19 mm., weighing 28 parts, was collected after the main fraction, and consisted of a mixture of the above ester with some unhydrolyzed amide.

Example 17

250 parts of crude cyclohexanone cyanohydrin, containing 92% of pure cyanohydrin, were mixed into 294 parts of 100% sulphuric acid containing 1 part of copper, cooling being applied, and the rate of cyanohydrin feed being so adjusted as to maintain a temperature of 80° in the acid mixture. After introduction of the cyanohydrin, the mixture was heated to 120° for 1 hour, cooled to 110°, treated with 144 parts of water, and heated again to boiling under a reflux condenser for 2 hours. The product of hydrolysis of the cyclohexene carboxylamide was cooled to 80° and run into 500 parts of water. The layer of crude cyclohexene-1-carboxylic acid separating at the top was removed. It weighed 186 parts and contained 62.4% of acid. It was separated from viscous polymeric impurity by distillation under reduced pressure, and boiled at 140–142°/13 mm.

Example 18

155 parts of crude methyl-n-hexyl ketone cyanohydrin, prepared by the union of the ketone with hydrogen cyanide, and containing 72% of actual cyanohydrin, were added to a mixture of 1 part of precipitated copper and 150 parts of 99.9% sulphuric acid. The temperature of the mixture was maintained at 80–85°, and it was well agitated.

On completion of addition of the cyanohydrin, the mixture was heated for 1 hour to 110°. Analysis of the product showed a content of 33.6% nonenamide, corresponding to a 92.1% conversion of the cyanohydrin.

After cooling the amide mixture to about 80°, a mixture of 36 parts of water and 64 parts of methyl alcohol was added and the whole heated by a boiling water bath for 48 hours under a reflux condenser. The product was run into its own volume of water, and the ester layer was removed. It weighed 146 parts, and contained 56.2% of ester and 15.8% of nonenic acid. It was purified by agitating with dilute alkali to extract the acid, washing with water, and drying over calcium chloride. The dried ester weighed 91 parts. Distilled under reduced pressure, it gave 6 parts of watery ester boiling up to 96°/17 mm., 35 parts of methyl-alpha-methyl beta-n-amylacrylate, B. P. 96°/17 mm., and a fraction, boiling 100°/17–158°/15 mm., consisting of a mixture of this ester with unsaponified amide, which amounted to 31 parts. Finally, a small crystalline fraction of pure amide, B. P. 158°–164°/15 mm. was obtained.

Example 19

Alpha-methylcrotonic acid was made from 396 parts of methyl ethyl ketone cyanohydrin (82.5%), 480 parts of 100% sulphuric acid, and 188 parts of water. The crude acid separated from the reaction mixture contained 85% of methylcrotonic acid. 153 parts of this were mixed with 39.3 parts of ethylene glycol and 9.2 parts of concentrated sulphuric acid, heated to 100° C. for 15 hours, and distilled under reduced pressure. The distillate up to 150°/20 mm. amounted to 158 parts. This was freed from acid with dilute alkali, washed with water and redistilled. Glycol alpha-methylcrotonate passed over between 150–170°/20 mm., and weighed 53 parts.

Example 20

396 parts of 82.5% methyl-ethyl-ketone cyanohydrin were run into 480 parts of sulphuric acid (100%), the temperature being maintained at 80–85°. The product was heated 1 hour to 130°, cooled to 100°, and treated with 648 parts of benzyl alcohol and 54 parts of water. The mixture was heated to 100° for 26 hours, and run into an equal volume of water. The ester layer was separated, and weighed 810 parts. It contained 32.6% of benzyl alpha-methylcrotonate, and 1.1% of alpha-methylcrotonic acid.

This crude ester was washed with dilute alkali to remove the free acid, and purified by fractional distillation. 351 parts of ester were collected over the range 130–180°/10 mm., and a considerable residue containing benzyl ether remained. The benzyl alpha-methylcrotonate fraction was redistilled and yielded 62 parts boiling 100–160°/17 mm., and 268 parts boiling 160–180°/17 mm.

From a consideration of the above specification, it will be realized that many changes may be made in the details therein given without departing from the invention or sacrificing any of its advantages.

I claim:

1. A process for the preparation of unsaturated organic compounds which comprises reacting a ketone cyanohydrin with a strongly concentrated acid selected from the group consisting of sulphuric acid, sulfonic acids, alkyl sulphuric acids, phosphoric acid and hydrogen chloride at a temperature below approximately 140° C.

2. A process for the preparation of unsaturated organic compounds which comprises reacting a symmetrical ketone cyanohydrin with a strongly concentrated acid selected from the group consisting of sulphuric acid, sulfonic acids, alkyl sulphuric acids, phosphoric acid and hydrogen chloride at a temperature below approximately 140° C.

3. A process for the preparation of unsaturated organic compounds which comprises reacting unsymmetrical ketone cyanohydrin with a strongly concentrated acid selected from the group consisting of sulphuric acid, sulfonic acids, an alkyl sulphuric acid, phosphoric acid and hydrogen chloride at a temperature below approximately 140° C.

4. A process for the preparation of unsaturated organic compounds which comprises reacting a ketone cyanohydrin with a strongly concentrated acid selected from the group consisting of sulphuric acid, sulfonic acids, alkyl sulphuric acids, phosphoric acid and hydrogen chloride at a temperature below approximately 140° C. and heating the reaction mixture with an alcohol.

5. A process for the preparation of unsaturated organic compounds which comprises reacting a symmetrical ketone cyanohydrin with a strongly concentrated acid selected from the group consisting of sulphuric acid, sulfonic acids, alkyl sulphuric acids, phosphoric acid and hydrogen chloride at a temperature below approximately 140° C. and heating the reaction mixture with an alcohol.

6. A process for the preparation of unsaturated organic compounds which comprises reacting an unsymmetrical ketone cyanohydrin with a strongly concentrated acid selected from the group consisting of sulphuric acid, sulfonic acids, an alkyl sulphuric acid, phosphoric acid and hydrogen chloride at a temperature below approximately 140° C. and heating the reaction mixture with an alcohol.

7. A process for the preparation of unsaturated organic compounds which comprises reacting a ketone, having the structural formula

in which R₁ is an organic hydrocarbon radical, R₂ is a radical selected from the group consisting of an organic hydrocarbon radical, hydrogen and a halogen, and R₃ is a radical selected from the group consisting of an organic hydrocarbon radical, hydrogen and a halogen, with hydrocyanic acid in the presence of a strong basic catalyst, and adding the resulting product gradually with stirring to a strongly concentrated acid selected from the group consisting of sulphuric acid, sulfonic acids, an alkyl sulphuric acid, phosphoric acid and hydrogen chloride at a temperature below approximately 140° C.

8. A process of producing unsaturated organic acid esters of monohydric alcohols which comprises treating a ketone cyanohydrin with sulphuric acid of from 94% strength to fuming sulphuric acid containing 10% dissolved sulphur trioxide at a raised temperature not below approximately 80° C., and heating the reaction mixture with a monohydric alcohol.

9. A process of producing unsaturated organic acid esters of monohydric alcohols which comprises treating a ketone cyanohydrin with sulphuric acid of from 94% strength to fuming sulphuric acid containing 10% dissolved sulphur trioxide at a temperature between about 100° and 110° C., and heating the reaction mixture with a monohydric alcohol.

10. A process of producing unsaturated organic acid esters of monohydric alcohols which comprises treating a ketone cyanohydrin with fuming sulphuric acid at a temperature between about 100 and 110° C., maintaining the mixture at a temperature of about 140° C. for at least about an hour, and heating the reaction mixture with a monohydric alcohol.

11. In a process of producing unsaturated organic acid esters of monohydric alcohols the steps which comprise treating a ketone cyanohydrin with sulphuric acid of from 94% strength to fuming sulphuric acid containing 10% dissolved sulphur trioxide at a temperature between 60 and 140° C. and heating the reaction mixture in the presence of an antipolymerization catalyst.

12. A process of producing the ester of an unsaturated acid which comprises introducing one molecular proportion of a ketone cyanohydrin into 1¼ to 1½ molecular proportions of sulphuric acid of from 94% strength to fuming sulphuric acid containing 10% dissolved sulphur trioxide, maintaining the temperature at approximately 70-75° C. during the addition and subsequent thereto raising the temperature to approximately 100° C. until substantially all of the ketone cyanohydrin has reacted, cooling the reaction mixture and adding approximately 1 molecular proportion of an aliphatic alcohol, reheating to a temperature of approximately 90° C. and maintaining the mixture at that temperature until esterification is complete.

13. A process of producing the ester of an unsaturated acid which comprises adding a ketone with hydrocyanic acid in the presence of a strong basic catalyst, gradually with stirring, to approximately 1¼ to 1½ molecular proportions of sulphuric acid of from 94% strength to fuming sulphuric acid containing 10% dissolved sulphur trioxide per molecular proportion of the ketone cyanohydrin contained in the crude reaction mixture, the temperature during the addition being maintained at approximately 75° C., increasing the temperature to approximately 100° C. until substantially all of the ketone cyanohydrin has reacted, then further increasing the temperature to not more than approximately 140° C., and holding at that temperature for about one hour, cooling the thus heated reaction mixture and adding thereto approximately 1 molecular proportion of an alcohol, reheating to a temperature of approximately 90° C., and maintaining the mixture at that temperature until esterification is substantially complete.

14. A process of producing unsaturated organic acid esters of monohydric alcohols which comprises reacting a ketone with hydrocyanic acid in the presence of potassium hydroxide as a catalyst, reacting the crude product obtained with sulphuric acid of from 94% strength to fuming sulphuric acid containing 10% dissolved sulphur trioxide, and esterifying the crude reaction mixture with a monohydric alcohol.

15. The process in accord with claim 8 in which the ketone cyanohydrin is methyl ethyl ketone and the alcohol is methanol.

16. The process in accord with claim 8 in which the ketone cyanohydrin is diethyl ketone and the alcohol is ethanol.

17. A process of producing methacrylic esters of monohydric alcohols which comprises treating acetone cyanohydrin with sulphuric acid of from 94% strength to fuming sulphuric acid containing 10% dissolved sulphur trioxide at a raised temperature not below approximately 80° C., and heating the reaction mixture with a monohydric alcohol.

18. A process of producing methacrylic esters of monohydric alcohols which comprises treating acetone cyanohydrin with sulphuric acid of from 94% strength to fuming sulphuric acid containing 10% dissolved sulphur trioxide at a temperature between about 100° and 110° C., and heating the reaction mixture with a monohydric alcohol.

19. A process of producing methacrylic esters of monohydric alcohols which comprises treating acetone cyanohydrin with sulphuric acid of from 94% strength to fuming sulphuric acid containing 10% dissolved sulphur trioxide at a temperature between about 100° and 110° C., subsequently maintaining the mixture at a temperature of about 140° C. for at least about an hour, and heating the reaction mixture with a monohydric alcohol.

20. In a process of producing methacrylic esters of monohydric alcohols the steps which comprise treating acetone cyanohydrin with sulphuric acid of from 94% strength to fuming sulphuric acid containing 10% dissolved sulphur trioxide at reacting temperature and subsequently heating the reaction mixture in the present of an antipolymerization catalyst.

21. In a process of producing methacrylic esters of monohydric alcohols the steps which comprise treating acetone cyanohydrin with sulphuric acid of from 94% strength to fuming sulphuric acid containing 10% dissolved sulphur trioxide at reacting temperature and heating the reaction mixture in the presence of an antipolymerization catalyst selected from the group consisting of sulphur, diphenylamine, copper, hydroquinone and cresol.

22. A process of producing methacrylic esters of monohydric alcohols which comprises treating one molecular proportion of acetone cyanohydrin with between 1¼ and 1½ molecular proportion of sulphuric acid of from 94% strength to fuming sulphuric acid containing 10% dissolved sulphur trioxide at reacting temperature and heating the reaction mixture with a monohydric alcohol.

23. A process of producing methyl methacrylate which comprises adding acetone cyanohydrin to sulphuric acid of from 94% strength to fuming sulphuric acid containing 10% dissolved sulphur trioxide at a raised temperature not below approximately 80° C., adding methyl alcohol to the reaction mixture, heating to a temperature of about 100° C. for at least an hour, and separating methyl methacrylate from the reaction products by distillation.

24. A process of producing the methyl ester of methacrylic acid which comprises introducing one molecular proportion of acetone cyanohydrin into 1¼ to 1½ molecular proportion of sulphuric acid of from 94% strength to fuming sulphuric acid containing 10% dissolved sulphur trioxide, maintaining the temperature at approximately 70–75° C. during the addition and subsequent thereto raising the temperature to approximately 100° C. until substantially all of the acetone cyanohydrin has reacted, cooling the reaction mixture and adding at least 1 molecular proportion of methanol, reheating to a temperature of approximately 90° C. and maintaining the mixture at that temperature until esterification is complete.

25. A process of producing the methyl ester of methacrylic acid which comprises mixing acetone with hydrocyanic acid in the presence of a strong basic catalyst gradually with stirring, to approximately 1¼ to 1½ molecular proportions of fuming sulphuric acid containing 10% dissolved sulphur trioxide per molecular proportion of the acetone cyanohydrin contained in the crude reaction mixture, the temperature during the addition being maintained at approximately 75° C., increasing the temperature to approximately 100° C. until substantially all of the acetone cyanohydrin has reacted, then further increasing the temperature to not more than approximately 140° C., cooling the thus heated reaction mixture and adding thereto at least 1 molecular proportion of methanol, reheating to a temperature of approximately 90° C., and maintaining the mixture at that temperature until esterification is substantially complete.

26. A process of producing methacrylic esters of monohydric alcohols which comprises reacting acetone with hydrocyanic acid in the presence of a strong basic catalyst, reacting the crude product obtained with sulphuric acid of from 94% strength to fuming sulphuric acid containing 10% dissolved sulphur trioxide at reaction temperature and esterifying the crude reaction mixture with a monohydric alcohol.

27. A process of producing methacrylic esters of monohydric alcohols which comprises reacting acetone with hydrocyanic acid in the presence of potassium hydroxide as a catalyst, reacting the crude product obtained with sulphuric acid of from 94% strength to fuming sulphuric acid containing 10% dissolved sulphur trioxide at a temperature between 80 and 140° C., and esterifying the crude reaction mixture with a monohydric alcohol.

28. A process of producing methacrylic esters of monohydric alcohols which comprises reacting acetone with hydrocyanic acid, treating the product so obtained with sulphuric acid of from 94% strength to fuming sulphuric acid containing 10% dissolved sulphur trioxide at reaction temperature, and heating the reaction mixture with a monohydric alcohol.

29. In a process of producing methacrylic esters of monohydric alcohols from acetone cyanohydrin and sulphuric acid of from 94% strength to fuming sulphuric acid containing 10% dissolved sulphur trioxide the step which comprises heating the reaction product resulting from the interaction of the acetone cyanohydrin and sulphuric acid to a temperature ranging from approximately 100–140° C. prior to esterification with a monohydric alcohol.

30. A process of producing methyl methacrylate which comprises reacting acetone with hydrocyanic acid, treating the product of the acetone-hydrocyanic acid reaction with fuming sulphuric acid at reaction temperature, heating the reaction product to a temperature sufficient to effect unsaturation, and subsequently esterifying the resulting product with methanol.

JOHN WILLIAM CROOM CRAWFORD.